UNITED STATES PATENT OFFICE.

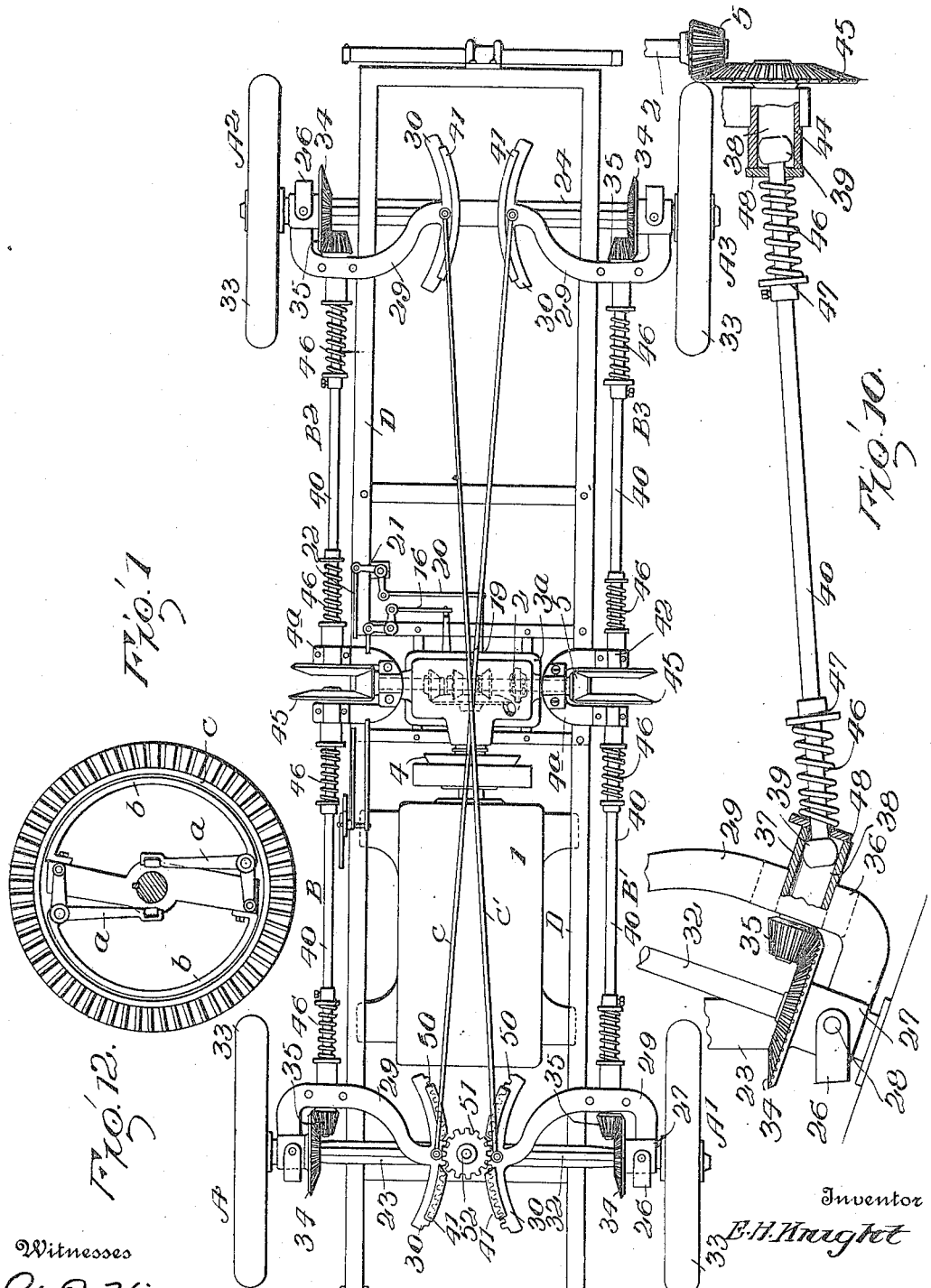

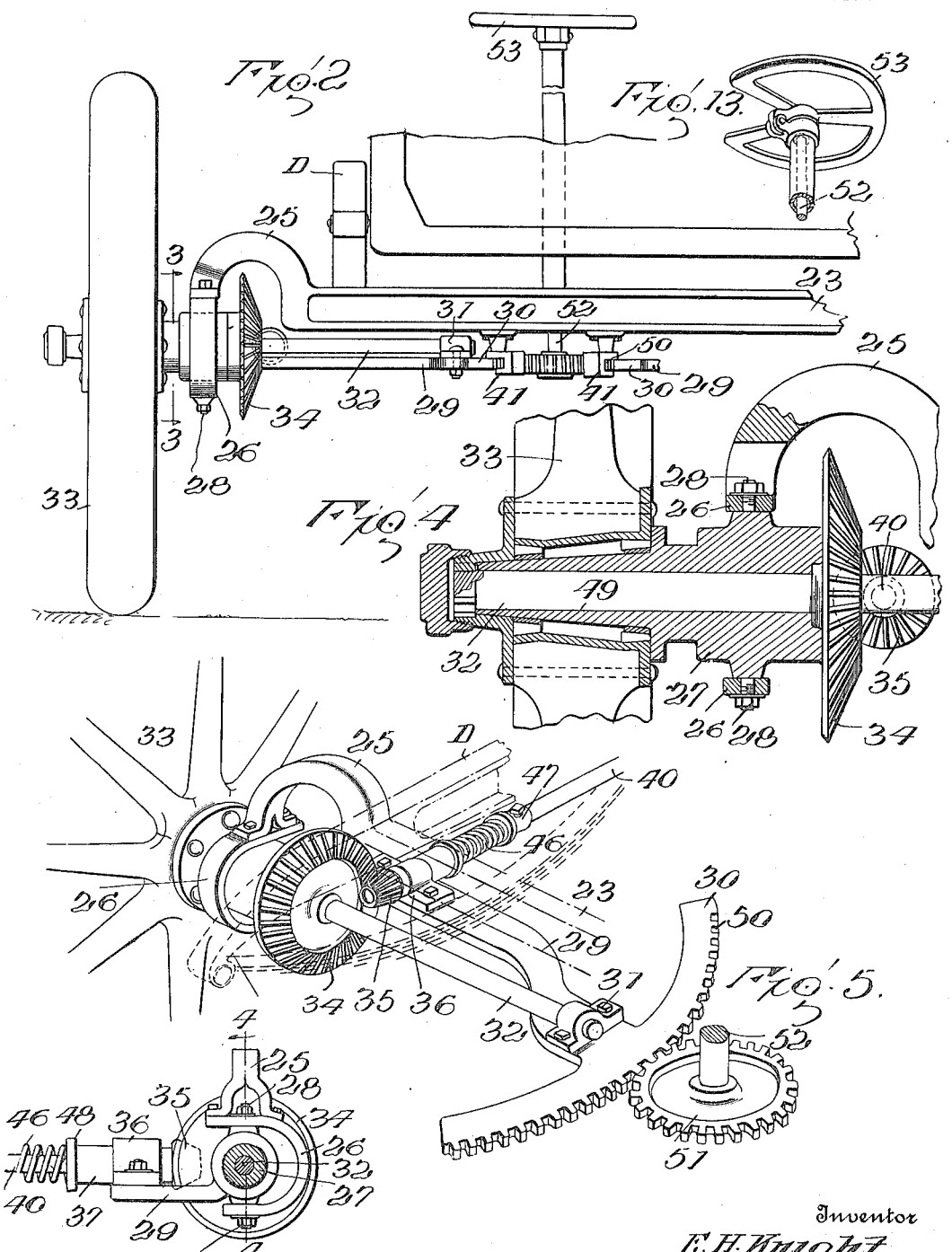

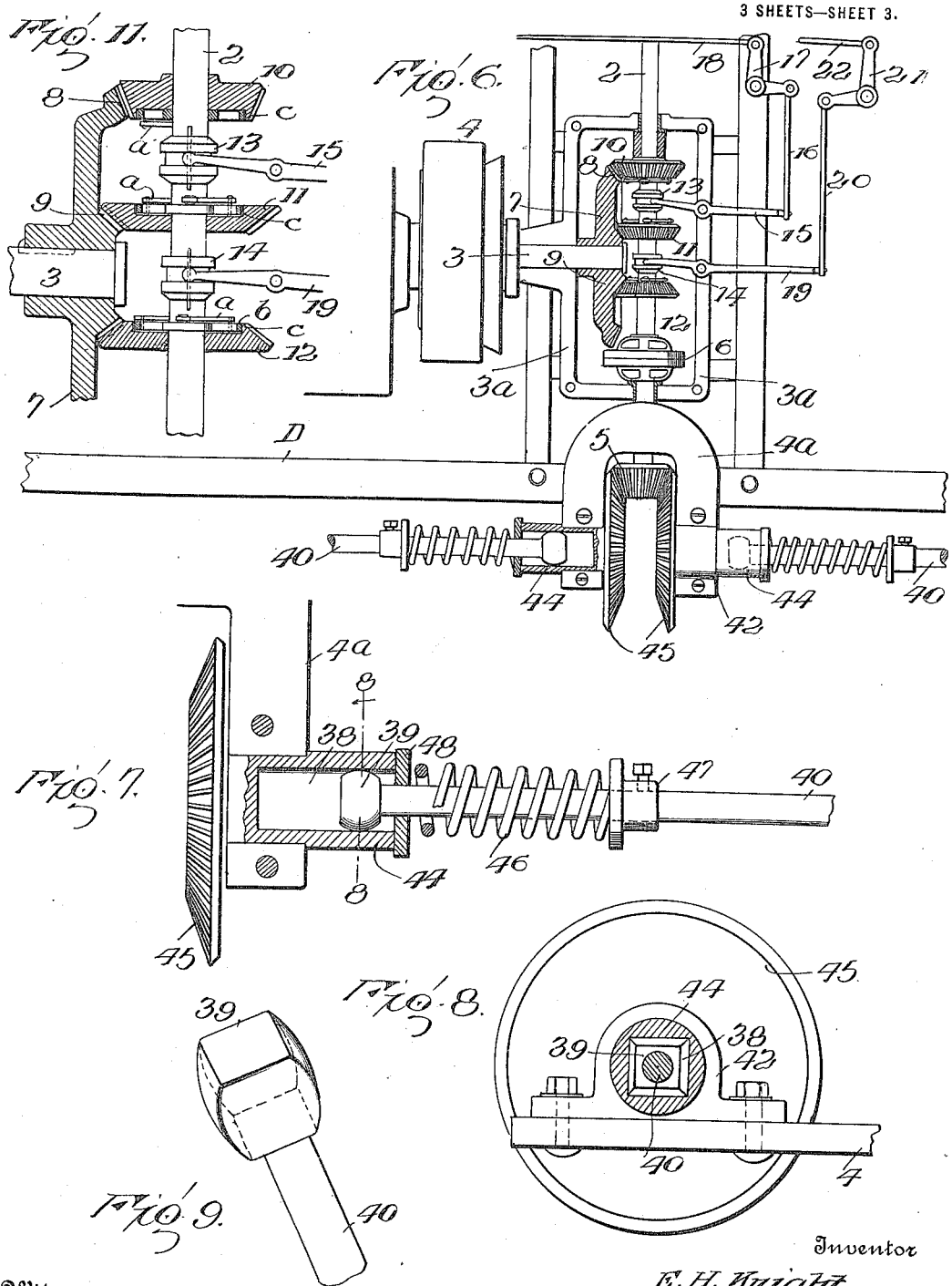

EDMUND H. KNIGHT, OF CHARLEVOIX, MICHIGAN.

FOUR-WHEEL MOTOR-DRIVEN VEHICLE.

1,233,372. Specification of Letters Patent. Patented July 17, 1917.

Application filed October 28, 1914, Serial No. 869,072. Renewed December 9, 1916. Serial No. 136,090.

*To all whom it may concern:*

Be it known that I, EDMUND H. KNIGHT, citizen of the United States, residing at Charlevoix, in the county of Charlevoix and State of Michigan, have invented certain new and useful Improvements in Four-Wheel Motor-Driven Vehicles, of which the following is a specification.

The invention has relation to motor-propelled vehicles and has for its primary object to apply the driving force to the several supporting wheels, whereby each of such wheels is utilized as a tractor and also to mount the wheels in such a manner that they may all be utilized for directing the course of the vehicle, thereby enabling the vehicle to be turned in a comparatively small space.

A further purpose of the invention is to equalize the load throughout the framework or chassis of the machine and thereby prevent abnormal strain on any particular part which would tend to cause unequal wear and to detract from the smooth and even running both of the vehicle and the parts comprising the power transmission.

Another object of the invention is the provision of a motor-driven vehicle having the power applied to each of the supporting wheels and having the several parts arranged so as not to interfere with one another and so disposed as to be readily accessible for inspection, replacements or repairs such as may be necessary to keep the working parts in prime condition.

The invention also has for its object to provide a novel and peculiar form of transmission which will readily conform to the various adjustments and movements of the parts without producing any binding action which would tend to materially detract from the motive power or produce excessive wear on the surfaces of the parts in contact.

The invention furthermore has for its object to construct the mountings and concomitant parts coöperating with each of the vehicle or supporting wheels so that they may be used interchangeably, thereby simplifying the construction and the initial cost, as well as minimizing the outlay for replacements when repairs become necessary.

The invention also has for its object to construct and arrange the mountings of the several supporting wheels to admit of the power being positively applied thereto in any position which they may occupy with the same facility so that the vehicle is propelled with equal uniformity irrespective of its course or direction.

Other objects and advantages will appear to those skilled in the art as the nature of the invention is comprehended and to this end reference is to be had to the following description and the drawings hereto attached, in which:—

Figure 1 is a bottom plan view of the chassis or running gear of a motor vehicle embodying the invention.

Fig. 2 is a fragmentary view as seen from the front.

Fig. 3 is a detail view on the line 3—3 of Fig. 2.

Fig. 4 is an enlarged view on the line 4—4 of Fig. 3.

Fig. 5 is a detail perspective view of the mountings and parts associated with one of the front wheels.

Fig. 6 is an enlarged view of the speed gearing.

Fig. 7 is an enlarged view showing one of the miter gears and the shaft associated therewith.

Fig. 8 is a view on the line 8—8 of Fig. 7.

Fig. 9 is a detail perspective view of an end portion of a transmission shaft.

Fig. 10 is a detail view showing the transmission between the driving shaft and the vehicle wheels.

Fig. 11 is an enlarged sectional view of the speed gearing and coöperating clutches.

Fig. 12 is an enlarged face view of one of the speed gears showing the clutch coöperating therewith.

Fig. 13 is a detail perspective view of the upper end of the steering shaft showing the hand wheel hinged thereto.

Corresponding and like parts are referred to in the following description and indicated in all the views of the accompanying drawings by the same reference characters.

The invention is illustrated in connection with a motor vehicle of the type embodying four supporting wheels, and inasmuch as each of the four wheels is similarly mounted such wheels and the parts associated therewith are for clearness designated as units by the reference letters A, A′, A² and A³. The transmissions between the units and the drive shaft are substantially alike and are designated by the reference letters B, B′, B² and B³. As the several units comprising the vehicle wheels and adjunctive parts are alike, and as the transmission units are substantially identical in construction and arrangement a description of one unit of each group is sufficient for a full understanding thereof.

The engine is indicated by the numeral 1 and may be of any type generally employed for propelling motor vehicles. The drive shaft 2 is arranged transversely of the framework or chassis of the machine and is adapted to be connected with the engine by means of a jack shaft 3 and a clutch 4, the latter being of any type and arranged to be operated in any usual way for connecting and disconnecting the drive shaft with the engine. The chassis or framework of the vehicle is designated by the reference letter D and may be of any design or construction according to the type of machine for which the invention is adapted. The drive shaft 2 is mounted in bearings provided upon a frame 3ª and yokes 4ª, the latter being of U-shape and secured to the longitudinal bars of the chassis D with their open ends facing outward. A pinion 5 is fastened to each end of the drive shaft 2. A differential 6 of any construction is located in the length of the drive shaft 2 to compensate for variations in the movements of the several transmissions incident to turning of the vehicle when in motion. A gear wheel 7 is secured to the rear end of the jack shaft 3 and is formed on its rear face with concentric cog-gearing 8 and 9, such cog-gearing being of the miter variety to mesh with corresponding cog gearing of miter pinions 10, 11 and 12 which are loose upon the drive shaft 2. The miter pinions 10, 11 and 12, are prevented from having any longitudinal movement on the shaft 2 but are free to turn thereon and are adapted to be secured to such shaft for rotation therewith. For this purpose a clutch member 13 is splined upon the shaft and is arranged to operate between the miter pinions 10 and 11. The clutch member 13 is tapered at its opposite ends so as to engage and operate levers a associated with expanding clutch members b coöperating with clutch rings c formed upon the adjacent faces of the miter pinions 10 and 11. The clutch member 13 is adapted to be moved to a neutral position or to engage the clutch operating levers a of either of the miter pinions 10 or 11 to cause it to rotate with the shaft 2. When the clutch member 13 is moved outward, the pinion 10 is caused to rotate with the shaft 2, the latter being driven at a relatively high speed. When the clutch member 13 is moved inward to throw the pinion 11 into clutched engagement with the shaft 2, the pinion 11 is caused to rotate with the shaft 2, and the latter is driven at a relatively low speed. It will thus be understood that the machine is adapted to be driven forward at either a high speed or a low speed. For reversing the vehicle, the pinion 12 is adapted to be secured to the shaft 2 by means of a clutch member 14 which is splined upon the shaft 2. The clutch member 14 is tapered at one end to engage the levers of the clutch arranged to coöperate with the pinion 12. The clutches coöperating with the several pinions 10—11 and 12 are substantially alike and may be of any construction, the friction type being preferred. A shipper lever 15 coöperates with the clutch member 13 and is connected by means of a rod 16 with one arm of a bell-crank 17, the other arm of such bell-crank being connected by means of a rod 18 with an operating lever, not shown, under control of the driver. A shipper lever 19 coöperates with the clutch member 14 and is connected by means of a rod 20 with the bell crank 21, which in turn is connected by means of a rod 22 with the usual operating lever, not shown, under control of the driver.

The front axle 23 and the rear axle 24 are mounted in any usual manner, and each has its ends extending beyond the sides of the chassis or main frame D and curved as indicated at 25. The extremity of the curved end 25 is forked as indicated most clearly in Fig. 3 and is bolted or otherwise secured to one member of a bowed or U-shaped frame 26. The upper member of the frame 26 is longer than the lower member, as shown most clearly in Fig. 3, the longer member having the forked end of the axle fastened thereto, which is of advantage in distributing the strain. A sleeve 27 is provided with opposed trunnions 28 which are mounted in the arms of the frame or yoke 26 in such a manner as to admit of the sleeve turning freely in a horizontal plane about the trunnions as a vertical axis. The sleeve 27 has an arm 29 extending therefrom, such arm being of elbow shape and provided at its inner or free end with a curved bar 30 which is formed on the arc of a circle having its center coinciding with the vertical axis about which the arm 29 is mounted to turn. The arm 29 is provided with a bearing 31 near its inner or free end. A shaft 32 mounted in the sleeve 27 and bearing 31 is connected at its outer end with a wheel 33 of the vehicle or machine so as to rotate therewith. A miter gear 34 secured to the shaft 32 is in mesh with the miter pinion 35 mounted in a bearing 36 provided upon the arm 29. The miter pinion 35 is formed with an extension 37 in which is formed an opening 38 of non-circular outline in cross section. The opening 38 is preferably of square outline in transverse section and receives a head 39 at one end of a shaft 40. The faces of the head 39 are longitudinally curved to admit of the head 39 having a rocking movement within the opening 38. The outline of a transverse section of the head 39 at any point in its length is square, this being essential to cause the part 37 to rotate with the shaft 40 at any relative angular adjustment of the parts 37 and 40. The opening 38 and head 39 constitute a universal joint between the parts 37 and 40 whereby power may be transmitted from the shaft 40 to the part 37 whether said parts are in line or moved to a relative angular position, as indicated in Fig. 10. A curved guide 41 is secured to the axle and receives the curved bar or segment 30 at the free end of the arm 29. The guide 41 in addition to giving direction to the moving end of the arm 29 assists materially in providing a substantial support and connection between the arm 29 and the axle.

Each arm or member of the frame 4ª is provided with a bearing 42 in which is mounted a hollow extension or journal 44 provided at one end with a miter gear 45 which is in mesh with the adjacent miter pinion 5. The journal 44 corresponds with the hollow extension or journal 37 of the miter pinion 35. The opening 38 formed in the hollow journal 44 is of square outline and receives a head 39 at the end of the shaft 40 coöperating therewith. The construction of the parts 38 and 39 have been set forth at length hereinbefore and results in the formation of a universal joint between the shaft 40 and the journal 44. As shown most clearly in Fig. 1 there are two shafts 40 at each side of the chassis and the shafts upon the same side of the machine aline at their adjacent ends. The hollow journals 44 of the miter gears 45 are in line and are disposed to admit of the miter gears 45 meshing with opposite sides of the miter pinion 5, hence the strain incident to driving the miter gears 45 is equalized upon opposite sides of the pinion 5 and drive shaft 2. The hollow journals 37 and 44 are of a length to admit of ample movement of the heads 39 therein when the vehicle wheels are turned for steering the machine. To centralize the shafts 40 each is provided at opposite ends with an expansible helical spring 46 which is confined between a set collar 47 and a plate 48. The collar 47 is secured to the shaft 40 whereas the plate 48 is loose upon the shaft and is arranged to close the outer end of the opening 38 formed in the adjacent hollow journal 37 or 44. The helical spring 46 also serves to hold the plate 48 against the extremity of the hollow journal so as to maintain a close joint to prevent foreign matter entering the opening 38 or the escape of lubricant from such opening. The plate 48 fits snugly on the shaft 40 and moves with such shaft in the angular adjustments thereof incident to steering of the vehicle and the play of the axle due to the action of the vehicle springs in compensating for vibration.

Each of the wheels 33 may be mounted in any way, generally resorted to in the construction of motor vehicles. As indicated most clearly in Fig. 4 the sleeve 27 is formed with an extension 49 which constitutes an arm upon which the wheel 33 is mounted. The shaft 32 passes through the extension 49 and its projecting end is coupled to the wheel 33 in any manner to cause rotation of the wheel with the shaft. This arrangement provides for removal of the wheel without requiring displacement of the shaft 32 or admits of the shaft 32 being removed without disturbing the wheel. It is also manifest that the shock and stress sustained by the wheel are expended upon the arm or hollow spindle formed by the extension 49 without being transmitted to the shaft 32, since the sole purpose of the shaft 32 is to transmit movement to the wheel which is utilized as a tractor for propelling the machine.

For steering, the curved bars or segments 30 of the arms 29 of the units A and A' are formed with teeth 50 which mesh with the teeth of a pinion 51 secured to the lower end of a steering shaft 52. The guides 41 receiving the toothed segments 30 are cut away to receive the toothed portion of the pinion 51. Rotation of the steering shaft 52 causes an opposite movement of the arms 29 with the result that the front wheels are inclined in the same direction thereby admitting of the machine making a quick turn. Moreover, to enable the vehicle to be turned in the shortest space possible, the front arms 29 are connected with the rear arms 29, by means of rods C and C'. The rod C connects the arm 29 of the unit A with the arm 29 of the unit A³ and the rod C' connects the arm of the unit A' with the arm of the unit A². When the inner end of the arm 29 of the unit A' is moved rearward the inner end of the arm 29 of the unit A² is correspondingly moved rearward, hence the wheels 23 of the units A' and A² have an opposite inclination. At the same time that the inner end of the arm 29 of the unit A' is moved rearward the inner end of the arm 29 of the unit A is moved forward and the inner end of the arm 29 of the unit A³ is correspondingly moved forward by reason of its connection with the arm of the unit A. This throws the wheels 33 of the units A and A³ at an opposite inclination. The wheels of the units A and A' are parallel and the wheels of the units A² and A³ are parallel but the inclination of the front and rear wheels is opposite and as a result the machine is enabled to make a turn in the smallest space possible. It is also noted that each of the vehicle or supporting wheels is utilized as a tractor for driving the machine with the result that the power is distributed and the wear upon the tires of all the wheels is uniform. The adjustment of the wheels for steering or the movements of such wheels incident to the action of the vehicle springs does not in any manner detract from or interfere with the application of the driving power, the same being uniformly applied under all conditions whether the machine is going straight ahead, turning, or is traveling over uneven surfaces.

It will be understood from the foregoing, taken in connection with the accompanying drawings that the invention provides a motor propelled vehicle in which the driving power may be applied with like force to each of the supporting wheels, and that such wheels in addition to being utilized as tractors also serve for purposes of steering with the result that the vehicle may be turned in a space approximately equal to its length which is of advantage when it is required to make a turn on a narrow roadway.

The hand wheel 53 provided at the upper end of the steering shaft 52 is hingedly connected to such shaft to admit of the hand wheel being turned into an upright position, so as to provide ample room for easy ingress and egress from the vehicle.

The drawings illustrate an adaptation of the invention but it is to be understood that various changes in form, construction and arrangement of the parts may be made within the scope of the invention as claimed, without departing from the nature of the invention.

Having thus described the invention what is claimed as new is:—

1. In a motor vehicle, the combination of a main frame, a pivoted support mounted thereon, a vehicle wheel carried by the pivoted support, operating gearing mounted upon the pivoted support for transmitting movement to the vehicle wheel, a driver mounted on the main frame, a shaft for transmitting movement from the driver to the operating gearing and connected with each by means of a universal joint capable of admitting of a relative longitudinal movement of the shaft, and a spring exerting a lengthwise pressure on the shaft to centralize the same with reference to the driver and operating gearing.

2. In combination, a main frame, a pivoted support mounted on the main frame, a wheel mounted on the pivoted support, operating gearing carried by the pivoted support and adapted to transmit movement to the wheel, a driver mounted on the main frame, a shaft for transmitting motion from the driver to the operating gearing and having a sliding and universal joint connection with each, and springs mounted on opposite ends of the shaft and exerting an opposite pressure thereon, to centralize the shaft with reference to the driver and operating gearing.

3. In combination, a main frame, a pivoted support mounted upon the main frame, a wheel carried by the pivoted support, operating gearing mounted on the pivoted support and adapted to transmit movement to the wheel, a driver mounted on the main frame, said driver and an element of the operating gearing each having a hollow journal, and a shaft for transmitting movement from the driver to the operating gearing, said shaft having heads at opposite ends adapted to make a sliding and a universal joint connection with the hollow journals of the driver and operating gearing.

4. In a motor vehicle, the combination of a relatively movable gear element having a hollow journal, and a shaft having a head at one end connected with the hollow journal by means of a sliding and universal joint connection, a plate mounted on the shaft and fitting the same snugly and closing the outer end of the hollow journal, and an expansible helical spring mounted upon the shaft and normally exerting a pressure upon such plate to hold the same in contact with the extremity of the journal at all relative angular adjustments of such journal and shaft.

5. In combination, a main frame, a pivoted support mounted on the main frame, a vehicle wheel carried by the pivoted support, operating gearing mounted upon the pivotal support and adapted to transmit movement to the vehicle wheel, an element of the operating gearing having a hollow journal, a driver mounted on the main frame and provided with a hollow journal, a shaft having heads at opposite ends connected with the respective hollow journals by means of a sliding and universal joint connection, plates mounted upon the ends of the shaft and snugly fitting the same and arranged in contact with the respective hollow journals to close the openings thereof, and expansible helical springs mounted upon end portions of the shaft and exerting a pressure upon the plates to hold the same in contact with the hollow journals.

6. In combination, a main frame, a pivoted support mounted on the main frame, a wheel mounted on the pivoted support, operating gearing carried by the pivoted support and adapted to transmit movement to the wheel, a driver mounted on the main frame, a shaft for transmitting motion from the driver to the operating gearing and having a sliding and universal joint connection with each, and means operating at all times to hold the shaft in centralized position with respect to the driver and operating gearing.

7. In a motor vehicle, the combination of a relatively movable gear element having a hollow journal and a shaft having a head at one end connected with the hollow journal by means of a sliding and universal joint connection, a plate mounted on the shaft and closing the end of the journal, and means for holding the plate in engagement with the journal irrespective of the relative positions of the journal and shaft.

In testimony whereof I affix my signature in presence of two witnesses.

EDMUND H. KNIGHT. [L. S.]

Witnesses:
ADELBERT J. USHER,
ANNA McHUGH.

Copies of this patent may be obtained for five cents each, by addressing the "Commissioner of Patents, Washington, D. C."